United States Patent Office 3,801,686
Patented Apr. 2, 1974

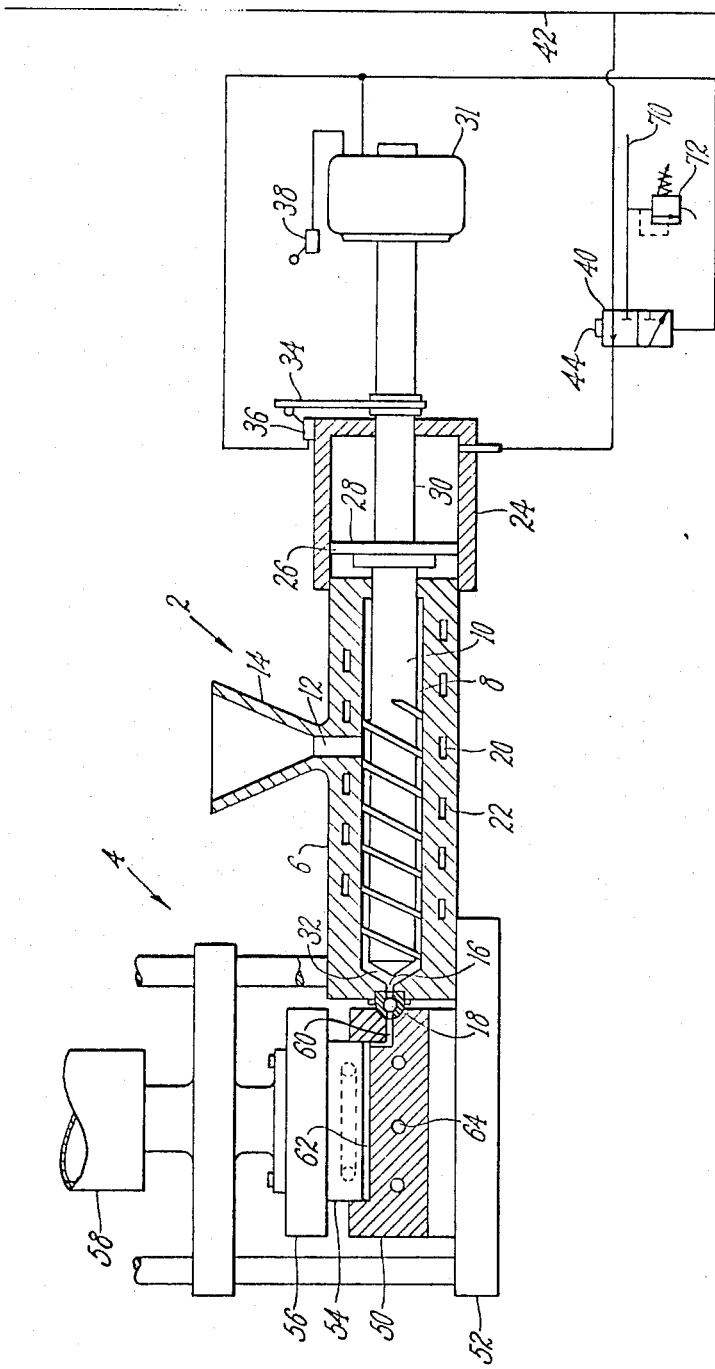

3,801,686
METHOD OF INJECTION MOLDING ARTICLES OF FOAM MATERIAL
William T. Kyritsis, Beverly Farms, and Robert C. Simmonds, Jr., Topsfield, Mass., assignors to USM Corporation, Boston, Mass.
Filed Jan. 24, 1972, Ser. No. 220,208
Int. Cl. B29d 27/00; B29b 3/00; B29f 1/08
U.S. Cl. 264—51                                         4 Claims

ABSTRACT OF THE DISCLOSURE

Method of injection molding articles in which a mixture of injection molding material and a blowing agent at a temperature below the foaming temperature is brought to foaming temperature directly before the mixture enters the mold and is introduced into the mold to fill the mold cavity during the induction period of the blowing agent. The blowing agent is deactivated in portions of the mixture which contact the walls of the mold and the volume of the mold cavity is increased to allow that portion of the mixture which is not in contact with the mold walls to expand.

FIELD OF THE INVENTION

This invention relates to injection molding and is directed more particularly to an injection molding method for the molding of articles of foam material.

BACKGROUND OF THE INVENTION

One known method of injection molding foam materials comprises melting an injection molding material and mixing the material with a blowing agent at a temperature sufficient to cause foaming of the mixture but at a pressure above the foamable pressure of the mixture so that the mixture substantially is prevented from foaming. Ideally, pressure is maintained on the mixture until it is delivered to a mold assembly where, upon reaching the mold cavity, the mixture expands and llls the cavity.

A difficulty experienced with the above method stems from the fact that as a practical matter it is difficult to maintain sufficient pressure on the mixture to prevent its foaming once it has reached its foaming temperature. Generally, expansion has taken place to a substantial degree before the mixture is inside the mold cavity. Foaming of the material prior to its being in the mold cavity usually results in rather low quality cell structure in the molded article, particularly where the molding of relatively thin sections is required. Moreover, this method is not suitable for molding articles having a high density, solid, unblown outer shell or skin and a uniformly foamed, low density interior, as desired in many applications of articles of foam material.

Another known method of injection molding foam material comprises melting an injection molding material and mixing the material with a blowing agent at a temperature below the foaming temperature of the agent and at a pressure equal or below the foaming pressure of the mixture, delivering the mixture to a mold cavity, and while delivering the mixture increasing its temperature to the foaming temperature or above, whereby to initiate foaming of the mixture.

While the second method holds several advantages over the first-mentioned method, it has been observed that where the mixing is accomplished at or below the foaming pressure of the mixture, a certain amount of foaming takes place even though the mixture as a whole has not reached the foaming temperature of the agent. This is probably due to "hot spots" occurring in the mixing facility, as for example, a plasticator.

Numerous approaches have been suggested for injection molding articles having the properties outlined in the paragraph preceding the last. Most commonly known is the method in which a mixture of a foamable resinous material and a blowing agent is heated to at least the blowing temperture of the blowing agent and then introduced into an expandable mold. The mold is provided with cooling means for cooling the mixture while the mold is held in unexpanded condition. As a result of confining the mixture in the reduced volume mold cavity and cooling the walls of the mold, the temperature of that portion of the mixture which is in contact with the cooled mold walls is reduced to below the softening point of the resin, while the portion of the mixture not in contact with the walls remains above the softening point. Thus, a substantially unblown, solidified skin is formed, whereafter the volume of the mold cavity is increased and the interior portion of the mixture is permitted to foam.

Still another known method teaches heating a mixture of foamable resin and blowing agent in an accumulation chamber to at least the blowing temperature of the blowing agent while holding the mixture under high pressure (above blowing pressure of the agent) in the accumulation chamber. Thereafter, the accumulation chamber is connected to an unexpandable mold. The pressure conditions in the mold cavity are at or below atmospheric and the walls of the mold are cool. Upon establishing connection between the outlet of the accumulatiqn chamber under pressure and the mold cavity, the hot mixture is rapidly injected into the cavity and "explodes" against the cold mold walls, thereby substantially destroying the effect of the blowing agent in the particles of that portion of the mixture which initially contact the walls of the mold. This "exploding" of the mixture is a result of the considerable pressure drop between the accumulation chamber and the mold. The portion of the mixture not in contact with the mold walls is permitted to foam upon entering the mold. Thus an article having a substantially unblown exterior and a foamed, cellular interior is obtained.

All methods known thus far are affected with disadvantages which have hampered the economical production of injection molded articles of superior quality having a smooth, high density, noncellular outer skin and a uniformly foamed, low density interior. In some instances, where the injection mixture is held at or above foaming temperature before injection, premature blowing of portions of the mixture before, during or immediately after injection will result in poor cell structure of the interior and undesirable quality, such as unwanted bubbles or voids, at the exterior of the finished product. In other cases, where the hot mixture is introduced into a cold, reduced volume cavity and prevented from foaming, the portion of the mixture adjacent the cold mold walls is permitted to solidify to below the softening point of the resin, so that the interior, which is thereafter permitted to foam, will expand unevenly and show non-uniform cell structure of undesirably high density. Moreover, due to the required step of holding the mold in reduced volume condition during solidification of the skin, the in-mold cycle time for each article is unduly prolonged and makes for a slow and thus expensive rate of production. A further disadvantage of this method resides in the fact that, after solidification of the resin at the surfaces of the article before expansion of the mold cavity, a complete filling of the expanded cavity cannot be achieved. Thus, details of the mold interior will not be reproduced precisely on the surface of the finished article.

In summary, the methods heretofore known involve the steps of mixing a foamable resin with a blowing agent and heating the mixture before injection to at least the blowing temperature of the agent, while preventing the mixture from foaming. Thereafter, the mixture is injected into a mold which is preferably cooled and expandable. A portion of the mixture is solidified in a substantially unfoamed state, whereafter the volume of the mold cavity is increased to permit foaming of the remainder of the mixture. Thus, the injection mixture is at its foaming temperature before the initiation of the actual injection stroke and complicated apparatus has to be employed to prevent premaure foaming. In order to prevent foaming of the mixture once it reaches the mold so as to obtain the desired skin or solid outer layer, further means are required to keep the mixture under pressure in the mold long enough to allow solidification of the skin. This complicated apparatus, in addition to the slow rate of production is ultimately reflected in the cost of the finished product.

SUMMARY OF THE INVENTION

It is an object of the present invention to overcome the above-mentioned disadvantages inherent in the method of injection molding articles of foam material having high density, unfoamed outer surfaces and a uniformly foamed interior.

With the above and other objects in view, the present invention contemplates a method of molding articles of foam material, comprising the steps of melting and mixing an injection molding material together with a blowing agent at a temperature which is below the normal foaming temperature of the blowing agent, raising the temperature of the mixture to a temperature at least equal to the normal foaming temperature of the mixture directly before entry of the mixture into a mold—for example, by heat generated in forcing the mixture through a passageway which resists flow of the mixture therethrough—introducing the mixture into a cooled, expandable mold cavity at a rate substantially to fill the mold cavity during the induction period of the blowing agent, deactivation of the blowing agent in that portion of the mixture which is in contact with the cold inner walls of the mold before development of blowing gas, and thereafter expanding the volume of the mold cavity and that portion of the mixture which is not in contact with the cold mold walls.

DESCRIPTION OF THE PREFERRED EMBODIMENTS

Reference is made to the accompanying drawing which shows, in simplified form, partially elevational and partially in section, one form of apparatus suitable for practicing the invention.

The apparatus in connection with the inventive process includes a plasticator unit 2 for plasticating injection molding material and blowing agent and a mold assembly 4 for the molding of articles of foam material. The plasticator unit 2 includes a plasticator housing 6 defining a chamber 8 in which is disposed a plasticator screw 10 for plasticating the molding material. The plasticator is provided with an inlet 12, to which is attached a feed hopper 14, and an outlet 16 which is provided with a nozzle valve 18. The plasticator housing 6 is provided with temperature control means 20 which comprises channels 22 in the housing 6 for conveying temperature control fluid to control the temperature in the chamber 8 and thereby the temperature of the material being plasticated.

The plasticator housing 6 is connected at one end to a cylinder 24 in which is disposed a piston 26 affixed to the screw 10. Pressure applied on the back 28 of the piston 26 causes the screw 10 to move in the chamber 8 axially toward the outlet 16, whereby to force material in the chamber 8, out of the outlet and into the mold assembly 4.

The plasticator screw 10 is provided with an extension portion 30 which is connected to a power source, such as an electric motor 31, for rotating the screw 10 in the plasticator chamber 8. Rotation of the screw 10 in the chamber 8 thoroughly mixes and plasticates the injection molding material and blowing agent fed into the chamber 8 through the hopper 14. As the material is plasticated it is urged forward, or leftwardly as viewed in the drawing, toward the outlet 16. When the nozzle valve 18 is closed the plasticated material accumulates in an area 32 forward of the screw 10 and forces the screw 10 rearwardly, the piston 26 moving rearwardly in the cylinder 24.

An actuator 34 is attached to the screw extension 30 and is adapted to engage a switch 36 at the forwardmost end of the stroke of the screw 10 to start the motor 31 whereby to start rotation of the screw 10. The actuator 34 is further adapted to engage a switch 38 at the rearwardmost end of the stroke of the screw 10 to stop the motor 31 whereby to stop rotation of the screw 10. In addition, the switch 28 may also operate to shift a two-way valve 40 to the position shown in the drawing, which interconnects the cylinder 24 and a fluid pressure line 42, whereby to pressurize the back 28 of the piston 26 and thereby urge the screw forward in the plasticator chamber 8.

The mold assembly may comprise a first mold member 50 mounted on a stationary platen 52 and a second mold member 54 carried by a movable platen 56. A platen moving means, such as a cylinder 58, is provided for moving the movable platen and thereby the second mold member 54 relative to the first mold member 50. One of the mold members 50, 54 is provided with a sprue channel 60 which interconnects a mold cavity 62 formed by the first and second mold members and the nozzle valve 18. The mold assembly is provided with temperature control channels 64 for conveying temperature control fluid.

In carrying out the inventive process, the motor 31 is started and the screw 10 thereby caused to rotate in the chamber 8. The screw 10 is initially in the position shown in the drawing, the forwardmost position. Injection molding material, in solid form, is introduced to the chamber 8 by way of the feed hopper 14 and the inlet 12. Blowing agent may be introduced in the same manner or by a separate entrance (not shown). The injection molding material may, for example, be polypropylene pellets dusted with azo-bis-formamide, the latter serving as blowing agent.

Rotation of the screw 10 thoroughly plasticates the molding material and blowing agent, reducing the mixture to fluid form and pushing it forward toward the outlet 16. The nozzle valve 18 is closed, causing an accumulation of molten material in the area 32 of the screw 10. Such accumulation of material urges the screw rearwardly. Opposing rearward movement of the screw 10 is fluid pressure on the back surface 28 of the piston 26. A pressurized fluid line 70 is connected to the cylinder 24 by way of the valve 40. The line 70 has an escape valve 72 which may be adjusted to insure the maintenance of a preselected pressure in the line 70 and thereby in the cylinder 24. When the pressure exerted by the accumulated material forward of the screw 10 overcomes the pressure of the line 70, the screw 10 moves rearwardly and continues to so move as additional material accumulates forward of the screw. The pressure behind the screw is preselected such that the pressure on the material in the plasticator chamber exceeds the pressure at which the material can foam. Thus, the back pressure on the screw 10 prevents foaming in the plasticator chamber 8 during the plastication process.

The temperature control means 20 associated with plasticator operates to keep the temperature of the material in the plasticator chamber 8 below the temperature at which the blowing agent will be activated. The material in the chamber 8 is, therefore, plasticated at temperatures and pressure which are too low and high, respectively, to permit foaming of the material during the plastication process.

Continued rearward movement of the screw 10 causes the actuator 34 to contact the switch 38 to stop the motor 31 and thereby the rotational motion of the screw 10. The plasticator is now in condition to deliver an accumulated quantity of material to a mold cavity. If such has not previously been done, the mold assembly 4 and plasticator 2 are brought into engagement in such a manner that the sprue channel 60 is in alignment with and proximate to the nozzle valve 18.

By depression of a push button 44, or by automatic means triggered by actuation of the switch 38, the two-way valve 40 is shifted to the position shown in the drawing, connecting the cylinder 24 with the fluid pressure line 42. The pressure in the line 42 is substantially higher than the pressure in front of the screw 10 and therefore causes the piston 26 and the screw to be driven forwardly. The nozzle valve 18 is opened by automatic means (not shown) and the material in front of the screw 10 is driven through the nozzle valve 18 and the sprue channel 60 into the mold cavity 62.

The outlet 16 of the plasticator comprises a passage which is appropriate in length and diameter to frictionally resist the flow therethrough whereby to impart heat to the material driven therethrough by the screw 10. The heat imparted to the material by the outlet passage is sufficient to raise the temperature of the material to the point at which the blowing agent therein reaches the blowing temperature. Accordingly, upon passage of the material through the outlet passage the material is at a high enough temperature to foam. However, the material is driven into the mold cavity during a period of time less than the time required for foaming. This time is dependent upon the induction period of the blowing agent, the induction period being the period of time between reaching the blowing temperature and development of blowing gas by the blowing agent. Hence, the induction period of the blowing agent is utilized to substantially fill the mold with unblown material. Upon contacting the cold walls of the mold cavity, the portion of the mixture adjacent the mold walls is cooled to a temperature below the blowing temperature of the agent, but preferably not to a temperature below the softening point of the resin. The blowing agent adjacent the cold mold walls is thus deactivated before the end of the induction period while the mixture preferably remains in a fluid state.

At the end of the induction period of the blowing agent, that portion of the mixture not in contact with the cold walls of the mold begins to foam and expand, and a simultaneous expansion of the volume of the mold cavity takes place. Due to the fact that substantially the entire mixture remains fluid after the deactivation of the blowing agent adjacent the mold walls and until expansion of the interior portion has taken place, all details of the interior walls of the mold will be reproduced very precisely in the finished article.

When the mold cavity is filled and the screw 10 has reached its forwardmost position, the nozzle valve 18 closes, sealing off the mold cavity, and the switch 36 is contacted by the actuator 34 to start the motor 31 and thereby the rotation of the screw 10 and to shift the valve 40 so that only pressure from the line 70 is admitted to the cylinder 24.

As will be apparent from the above description, the in-mold time for producing an article in accordance with the present invention is considerably shortened since injection and partial deactivation of blowing agent are accomplished during the induction period of the blowing agent, whereby the step of holding the mold in unexpanded condition for the purpose of solidification of a surface layer of the injected mixture is eliminated in the preferred operation. Moreover, since foaming of that portion of the mixture containing activated blowing agent may take place without delay for solidification and while substantially the entire mixture is still in a freely fluid state, complete filling of the expanded mold cavity and a uniform foam structure throughout the interior of the article thus produced are obtained.

Since certain obvious changes may be made in the described process without departing from the scope of the invention, it is intended that all matters contained herein be interpreted in an illustrative and not a limiting sense.

EXAMPLE

In this example the material to be foamed and molded was softened and plasticated in a Lombard research modified 200 ton machine with a capacity of 24 oz., a barrel diameter of 2½" and a length to diameter ratio 24:1. The temperature of the barrel was as follows. The rear temperature was 350°. A portion near the rear was at 260°, the temperature at the center of the barrel was 370° and the temperature adjacent the injection nozzle was 385°, all degrees being F.

The injection machine was operated with a screw speed of 50 r.p.m. and the back pressure maintained on the screw was 150 p.s.i.

The material foamed and molded in this example was an impact polystyrene (a rubber-modified polystyrene) commercially available as Sinclair-Koppers 535–60. The blowing agent was azodicarbonamide and 0.4% was used. The induction period depends, of course, upon the temperature and material with which the blowing agent is used and in the present instance the induction period was judged to be about 8 to 10 seconds. This is determined by blowing a composition including an unpigmented plastic material. Where the blown material has a yellow surface this is evidence that the blowing agent was chilled below its activation temperature before it had blown. The decomposition temperature of the blowing agent is listed by the manufacturer as about 392°.

The mold is a slab type mold with spacing of the surfaces of about 0.130" at the time the material is injected into the mold and with provision for controlled expansion to an ultimate thickness of .320". The mold temperature before injection of the plastic material is 75° F. When the material has been brought to the temperatures indicated the machine was activated to provide an injection stroke resulting in an injection time of about 1 second. The injected material is brought from an initial temperature of 385° F. to a temperature of 430° F. in passing through the restricted passageway to the mold. The mold is held in its spacing of 0.130" during injection up to about 8.5 milliseconds before completion of the injection stroke. The pressure in the mold during the injection is about 1500 p.s.i. When the clamp is released the mold is allowed to expand to its ultimate spacing of 0.320" in about 0.2 second. It is important to note that the mold is moved by the action of the piston or by other mechanical means to its expanded position and is not moved to its expanded position by the force of the blowing agent within the plastic. The in-mold pressure at the end of the expansion of the mold is about 100 p.s.i. and just before expansion was estimated at about 1500 p.s.i.

The temperature of the molded plastic surface at the completion of expansion is at least 290° F., this temperature being taken about 1.5 seconds after expansion is complete. In another run using the same operating procedures a maximum temperature of 310° F. was observed at 1.9 seconds after the expansion was complete. These temperatures were taken by an infrared spectrometer directly after opening of the mold. Mold temperatures as high as 210° F. have been used with this same material and with good results.

The density of the molded slab produced was approximately 0.5 gram per cc.

Having thus described our invention what we claim as new and desire to secure as Letters Patent of the United States is:

1. The method of injection molding articles, including the steps of forming a freely fluid molten mixture of a resinous injection molding material and a chemical or liquid to gas blowing agent while maintaining the mixture below the foaming temperature of the blowing agent, characterized by the fact that the temperature of the mixture is raised to a temperature at least equal to the normal foaming temperature of the mixture directly before injection of the mixture into the mold, the mixture is introduced into an expandable mold cavity having cold inner walls at a rate substantially to fill the mold cavity during the induction period of the blowing agent, the temperature of said inner walls being below the blowing temperature of the blowing agent and being sufficiently low to cool the portion of the mixture which contacts the cold inner walls of the mold below the blowing temperature of the blowing agent to arrest generation of blowing gas from the blowing agent in said portion of the mixture but not so cold as to cool said portion to a temperature below the softening point of said resinous material and solidify it prior to increasing the volume of the mold cavity, the volume of the mold cavity is increased beginning at a time at which substantially the entire mixture is in freely fluid state and blowing gas is generated in that portion of the mixture which is not in contact with the cold mold walls to foam the mixture.

2. Method of injection molding articles as defined in claim 1 in which the increment of heat needed to raise the temperature of the mixture is generated frictionally by forcing the mixture through a passageway at a rate coordinated with the length and cross section of the passageway to supply the increment of heat which will bring the temperature of the mixture to foaming temperature.

3. Method of injection molding articles as defined in claim 2 in which said blowing agent is a chemical compound which generates blowing gas by thermal decomposition.

4. Method of injection molding articles as defined in claim 3 in which increase in volume of the mold cavity take place at about the end of the induction period of said blowing agent.

References Cited

UNITED STATES PATENTS

| | | | |
|---|---|---|---|
| 2,460,831 | 2/1949 | Kovacs | 264—68 |
| 3,058,161 | 10/1962 | Beyer et al. | 264—47 |
| 3,437,722 | 4/1969 | Cronin et al. | 264—51 |
| 3,674,401 | 7/1972 | Annis et al. | 264—51 |
| 3,697,204 | 10/1972 | Kyritsis et al. | 264—48 |

FOREIGN PATENTS

| | | | |
|---|---|---|---|
| 1,194,192 | 6/1970 | Great Britain | 264—54 |
| 22,213 | 10/1964 | Japan | 264—48 |

DONALD E. CZAJA, Primary Examiner

R. W. GRIFFIN, Assistant Examiner

U.S. Cl. X.R.

260—2.5 E; 264—53, 54, 328, 329